United States Patent [19]

Hellwig et al.

[11] Patent Number: 5,912,923
[45] Date of Patent: Jun. 15, 1999

[54] SYSTEM FOR TRANSMITTING CODED SPEECH SIGNALS

[75] Inventors: Karl Hellwig, Nürnberg; Dietmar Lorenz, Erlangen; Rainer Dietsch, Heiligenstadt, all of Germany

[73] Assignee: U.S. Philips Corporaton, New York, N.Y.

[21] Appl. No.: 08/505,414

[22] Filed: Jul. 21, 1995

[30] Foreign Application Priority Data

Jul. 23, 1994 [DE] Germany ............................... 44 26 226

[51] Int. Cl.$^6$ ................................. H04B 3/23; H04M 9/08
[52] U.S. Cl. .......................... 375/254; 375/285; 370/290; 379/410; 381/71.1; 381/71.12
[58] Field of Search ..................................... 375/216, 232, 375/254, 285; 455/67.3, 73; 370/286, 288–291; 379/409–411; 381/71.1, 71.11, 71.12

[56] References Cited

U.S. PATENT DOCUMENTS

| | | | |
|---|---|---|---|
| 4,628,156 | 12/1986 | Irvin | 379/410 |
| 4,796,296 | 1/1989 | Amada et al. | 379/410 |
| 4,835,765 | 5/1989 | Bergmans et al. | 370/291 |
| 4,864,608 | 9/1989 | Miyamoto et al. | 379/409 |
| 4,897,832 | 1/1990 | Suzuki et al. | 370/287 |
| 4,924,492 | 5/1990 | Gitlin et al. | 379/93 |
| 4,935,919 | 6/1990 | Hiraguchi | 370/290 |
| 5,163,044 | 11/1992 | Golden | 370/286 |
| 5,313,498 | 5/1994 | Sano | 375/350 |
| 5,351,291 | 9/1994 | Menez et al. | 379/410 |
| 5,414,766 | 5/1995 | Cannalire et al. | 379/410 |
| 5,473,686 | 12/1995 | Virdee | 379/410 |
| 5,475,731 | 12/1995 | Rasmusson | 379/3 |
| 5,526,347 | 6/1996 | Chen et al. | 370/290 |

FOREIGN PATENT DOCUMENTS

| | | |
|---|---|---|
| 0491430 | 6/1992 | European Pat. Off. . |
| 0301627 | 4/1993 | European Pat. Off. . |

OTHER PUBLICATIONS

Advances in Speech Coding—IEEE Proceedings of the Workshop on Speech Coding for Telecommunications, 5.—8. Sep. 1989 Vancouver, XP 000419284, J. Chen et al "A Real Time Full Duplex 16/8KBPS CVSELP Coder with Integral Echo Canceller Implemented on a Single DSP56001", pp. 299–308.

"Advances in Speech Coding" by Bishnu and S. Atal, Vladimir Cuperman and Allen Gersho, Kluwer Academic Publishers 1991, pp. 69 to 79.

"Philips Telecommunication Review", vol. 49, No. 1, Mar. 1991, pp. 19 to 27.

PHD 93–189 (P 43 42 425.2).

*Primary Examiner*—Young T. Tse
*Attorney, Agent, or Firm*—David R. Treacy

[57] ABSTRACT

Complex coding of speech signals, as this is used, for example, in the GSM half rate speech coder, requires the use of a signal processor. On the other hand, a hands-free facility requires an arithmetic unit which adaptively calculates filter coefficients. This is only effected during speech pauses in which the speech coder is switched to a mode in which it generates codes for background noise with only little processing circuitry and expense. According to the invention, the signal processor for the coding device is therefore used for calculating the coefficients for the echo cancelling filter during speech pauses. This requires the use of not more than a single signal processor which can thus be used twice.

20 Claims, 2 Drawing Sheets

SYSTEM FOR TRANSMITTING CODED SPEECH SIGNALS

BACKGROUND OF THE INVENTION

The invention relates to a system for transmitting coded speech signals employing a very complex coding as described, for example, in the title "Advances in Speech Coding" by Bishnu and S. Atal, Vladimir Cuperman and Allen Gersho, Kluwer Academic Publishers 1991, more specifically, pp. 69 to 79 and a mobile station for such system and a circuit arrangement for such mobile station. A system of this kind is used especially for mobile radio to transmit speech signals between a mobile station and a fixed station. Such a coding requires much circuitry which can be realised in practice only with a highly sophisticated signal processor.

The speech signals are generated by natural speakers. As a result, during a conversation there are always speech pauses in which one side does not speak, but hears only the speech signals from the other side. To give the speaking person on this other side the certainty, however, that the connection between the two sides still exists, although the person on the first side does not speak for the moment, this first side generates codes for background noise and transmits same.

For the utilization of a speech link, the people speaking normally utilize a handset in which the receiver, i.e. loudspeaker and the microphone, are spatially separated, so that normally only a slight part of the acoustic signal produced by the loudspeaker reaches the microphone of that same handset. As a result, each speaker receives only a weak echo which is additionally slightly delayed and thus does not have an annoying effect. However, it is also desirable to utilize hands-free facilities in which the microphone and the loudspeaker both have a certain distance from the speaking person and in which there is also the effect that an acoustic signal transmitted by the loudspeaker reaches the microphone with a considerable amplitude and delay, so that the other side of the line receives a strong and considerably delayed echo, which is very annoying. To avoid this, cancelling arrangements are known to be used for cancelling acoustic echoes. They comprise a subtracter arrangement, a filter for filtering received speech signals and an arithmetic unit for calculating the filter coefficients of the filter. The filtered received speech signals are applied to the subtracter arrangement, and the arithmetic unit sets the filter coefficients, so that at the output of the subtracter arrangement the acoustic signal captured from the microphone is just compensated for by the filtered signal. The arithmetic unit calculates the filter coefficients only during a period of time in which nothing is spoken at the location in which echo cancellation takes place. For a proper echo cancellation, however, it is necessary to have an expensive arithmetic unit. Additionally, it is also possible to have controlled attenuations in the signal paths, as is described in the journal "Philips Telecommunication Review", Vol. 49, No. 1, March 1991, pp. 19 to 27. Due to this required expenditure, it is hard to realise a hands-free facility for speech signal transmission with complex coding, because the computational capability of a signal processor is normally insufficient and a 2-processor solution will be too costly.

SUMMARY OF THE INVENTION

Therefore, it is an object of the invention to provide a system for transmitting coded speech signals including complex coding in which system at least one side is adapted for hands-free operation and contains a cancelling arrangement for cancelling acoustic echoes, which cancelling arrangement requires little circuitry and expense.

This object is achieved according to the invention in that in the system the at least one side adapted for hands-free operation comprises a coding arrangement using a signal processor and a cancelling arrangement for cancelling acoustic echos comprising an adaptive filter and in that for determining the filter coefficients of the adaptive filter a calculation unit is provided which is formed by the signal processor of the coding arrangement.

The invention is based on the recognition of the fact that the signal processor in the coding arrangement generates only codes for the background noise in the periods of time in which the speaker on this side does not speak. To this end, the signal processor can be switched to a mode with considerably less processing circuitry as is described in German Patent Application P 43 42 425.2 incorporated herein by reference. As a result, processing capacity in the signal processor is unused during such speech pauses. On the other hand, the filter coefficients can only be calculated in these periods of time and, as a result, the signal processor of the coding arrangement can also be used for calculating the filter coefficients. Therefore, when complex coding of speech signals is to take place, it is possible to use a hands-free facility, with little additional circuitry, which circuitry mainly exists of the subtracter arrangement and the filter. The essential circuitry and expense of a hands-free facility which is formed by the arithmetic unit for determining the filter coefficients, is not necessary, because the signal processor of the coding arrangement can be used twice.

DETAILED DESCRIPTION OF THE PREFERRED EMBODIMENT

Figure 1:
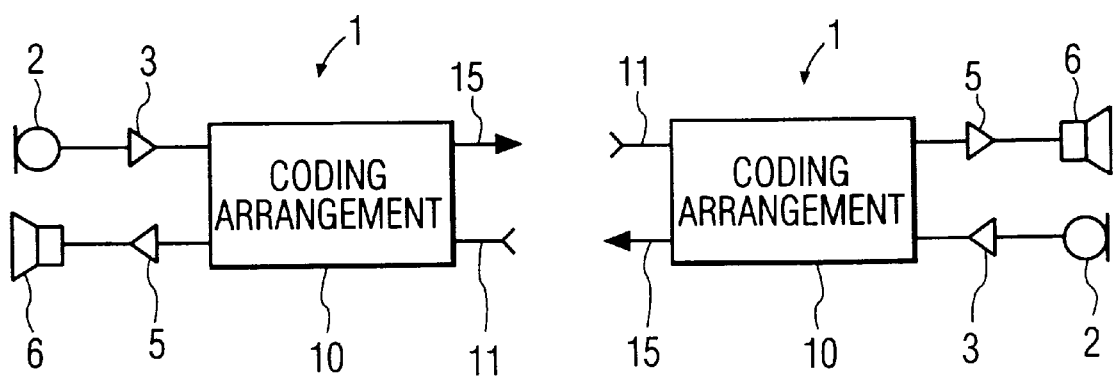
FIG. 1 is a simplified block diagram of one embodiment of a system according to the invention.

An illustrative embodiment of the invention will be further explained hereinafter with reference to FIGS. 1 and 2 of the drawing FIG. 1 shows a system having two terminal units 1, one at each side. Each terminal unit has a microphone 2 for receiving speech, an amplifier 3 which amplifies the microphone output and converts it to digital signals provided to a coding arrangement, a coding/decoding arrangement 10 (hereinafter referred to as a coding arrangement) for coding the speech signals, and an output 15. The coded output signal is carried, for example by radio transceivers (not shown) to the input 11 of the other terminal unit 1 where the coded signal is decoded in the coding arrangement 10, converted to analog signals and amplified in the amplifier 5 for acoustic radiation of the reconstituted speech signal via a loudspeaker 6.

Figure 2:
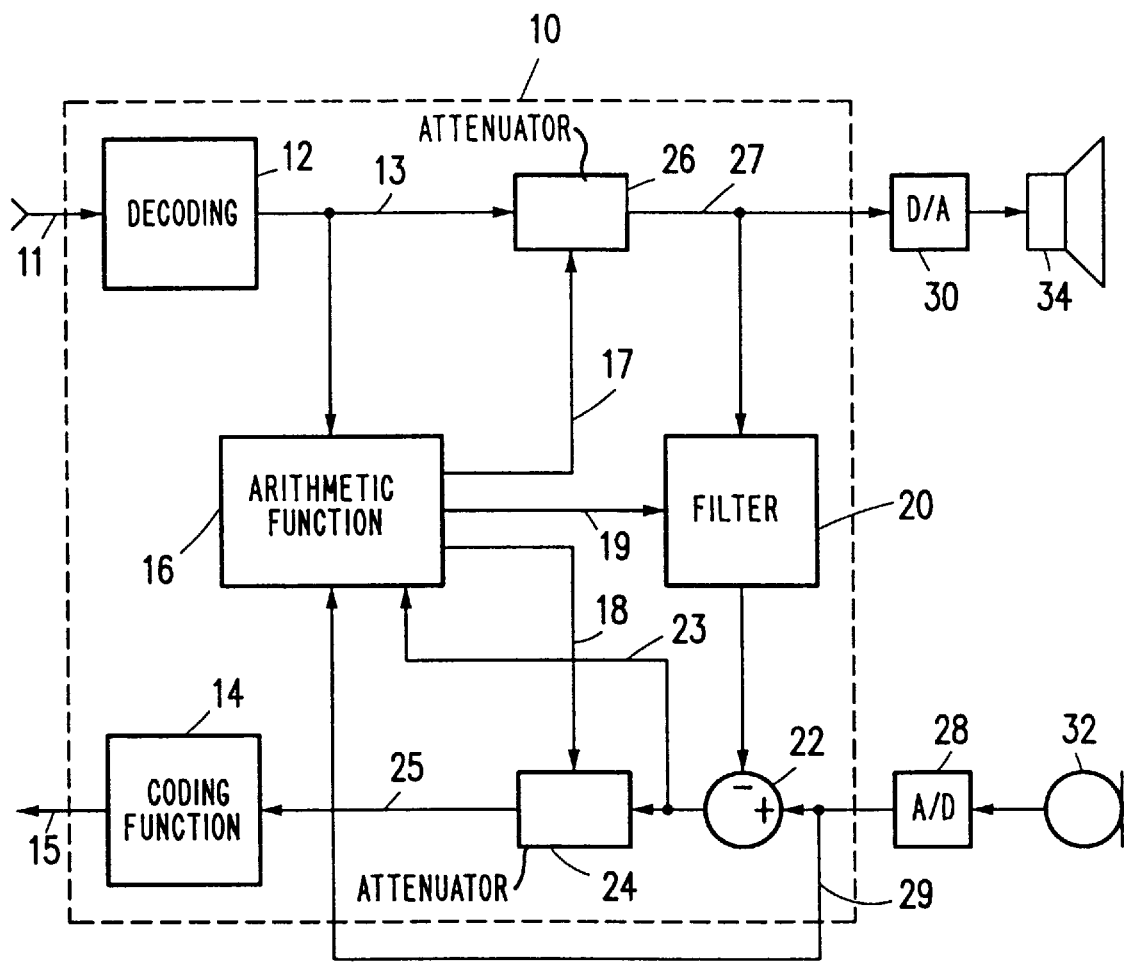
FIG. 2 is a function block diagram of a processor for use in the system of FIG. 1 according to the invention.

FIG. 2 is a functional block circuit diagram which shows the most important parts of a terminal unit which is located on one of the two sides of the system between which speech signals are transmitted. The received code words are fed to a line 11 of a receiver (not shown) and go to a decoding arrangement 12 which generates digital speech data on the line 13. They are applied to a controllable attenuator 26 and the attenuated digital speech signals are applied via the line 27 to a digital-to-analog converter and an amplifier 30 which supplies signals to a loudspeaker 34.

The acoustic signal emitted by the loudspeaker 34 is not only used by the using person, but also captured by the microphone 32 which furthermore receives the using person's speech. The total signal is applied to an analog-to-digital converter 28. The digital speech signal formed by the converter 28 is applied via the line 29 to the minuend input of a subtracter 22 whose subtrahend input is connected to line 21 from the output of a filter 20 which has adjustable coefficients. The filter 20 is also supplied with the received digital speech signal via line 27. The filter 20 is to copy the acoustic path between the loudspeaker 34 and the microphone 32, so that the signal component captured by the microphone 32 from the loudspeaker 34 is largely cancelled in subtracter 22. Then a reduced-echo speech signal is formed on line 23, which signal is applied to a further controllable attenuator 24. The attenuator output signal is applied to coding arrangement 14 via line 25, which coding arrangement generates on output 15 coded speech signals for a transmitting device (not shown).

The attenuators 24 and 26 as well as, more particularly, the filter 20 are controlled by an arithmetic unit 16 which receives the received decoded speech signal on line 13 as well as the signal captured by microphone 32 on line 29, and, additionally, the output signal of the subtracter 22 on line 23. The control of the attenuators 24 and 26 is apparent from the above journal "Philips Telecommunication Review" and the calculation of the filter coefficients is described, for example, in EP-A 0 301 627. The filter coefficients of the filter 20 are then calculated only in speech pauses i.e. when the person utilizing the circuit arrangement shown does not speak, which can be ascertained in a simple manner not further shown. Then the microphone 32 receives, in essence, only a signal from the loudspeaker 34. The arithmetic unit 16 calculates the filter coefficients of the filter 20, so that this signal captured by the microphone is cancelled in the subtracter arrangement 22 and there is practically no longer a signal on line 23.

As a result, however, the coding arrangement 14 receives practically no signal and on output 15 there are generated only codes for background noise. For this purpose, in speech pauses the coding arrangement 14 is switched to a mode in which only little processing circuitry is needed, which is already indicated in said German Patent Application P 43 42 425.2.

The arithmetic unit 16, the coding arrangement 14 and the decoding arrangement 12 as well as the filter 20 and the attenuators 24 and 26 are now formed by a unit 10 which, in essence, comprises a signal processor with a dedicated memory. This signal processor performs the functions of the decoding arrangement 12, the coding arrangement 14, the arithmetic unit 16 and the filter 20. In speech pauses the signal processor calculates the filter coefficients of the filter 20, whereas in the periods of time in which the using person himself speaks, no new filter coefficients are calculated, but the previously calculated coefficients are applied to the filter 20 unchanged, while the signal processor now generates the coded speech signals in accordance with the coding arrangement 14. At any rate, also the coded signals received on line 11 are decoded by the signal processor because this requires only little circuitry. The signal processor can thus take over the functions of the blocks 12, 14, 16 and 20 shown in the block circuit diagram, because the functions 14 and 16 are necessary only alternately, in essence. In this manner a hands-free facility combined with a complex speech coding has been created with little circuitry.

As described in the first paragraph of the application, a system of this kind can be used for speech transmission between a mobile station and a fixed station, but the invention is not so limited. Further, as described in the object of the invention either one only, or both sides, may be arranged for hands-free operation or be a mobile station.

We claim:

1. A system for simultaneously transmitting codes which are coded speech signals corresponding to respective speech signals between two sides, simultaneously in two directions, each side comprising a respective coding arrangement for generating codes, from the respective speech signals received by the respective side, to be transmitted to the other side, each respective coding arrangement comprising a signal processor having a respective processing capacity, wherein each coding arrangement generates respective coded speech signals, from the respective speech signals received by the respective side, requiring said respective processing capacity; and during pauses in speech received by the respective side, generates codes requiring a respective lesser processing capacity considerably less than said respective processing capacity, thereby leaving a respective unused processing capacity during said pauses, one side comprising means for canceling acoustic echoes, said means for canceling comprising a subtracter, and adaptive filter for filtering speech signals received by said one side, and arithmetic unit means operable only during said pauses in speech for determining the filter coefficients of the filter, and said arithmetic unit means being formed by said signal processor, and using the respective unused processing capacity, whereby a separate arithmetic unit for determining said filter coefficients is not necessary.

2. A system as claimed in claim 1, wherein said one side is arranged as a hands-free facility having a microphone and a loudspeaker spaced apart a distance sufficient to produce a strong and considerably delayed echo.

3. A system as claimed in claim 1, wherein each signal processor, during pauses in speech received from the respective side, generates only codes for background noise.

4. A system as claimed in claim 1, wherein said subtracter and adaptive filter, and a decoder for decoding received coded signals, are functions performed by said signal processor.

5. A system as claimed in claim 4, wherein each signal processor, during pauses in speech received from the respective side, generates only codes for background noise.

6. A system as claimed in claim 4, wherein said one side is arranged as a hands-free facility having a microphone and a loudspeaker spaced apart a distance sufficient to produce a strong and considerably delayed echo.

7. A mobile station adapted for hands-free operation, for simultaneously transmitting and receiving codes which are coded speech signals corresponding to respective speech signals, comprising:

a coding arrangement for generating codes from respective speech signals received by the mobile station, comprising a signal processor having a first processing capacity, wherein said signal processor generates respective coded speech signals, from the respective speech signals received by the mobile station, requiring said first processing capacity; and during pauses in speech received by the mobile station, generates codes requiring a second processing capacity considerably less than said first processing capacity, thereby leaving an unused processing capacity during said pauses, and means for canceling acoustic echoes, said means for canceling comprising a subtracter, an adaptive filter for filtering speech signals received by the mobile station, and arithmetic unit means operable only during said pauses in speech for determining the filter coefficients of the filter, said arithmetic unit means being formed by said signal processor, and using said unused processing capacity, whereby a separate arithmetic unit for determining said filter coefficients is not necessary.

8. A mobile station as claimed in claim 7, wherein said signal processor, during pauses in speech received by the mobile station, generates only codes for background noise.

9. A mobile station as claimed in claim 7, comprising a microphone and a loudspeaker spaced apart a distance sufficient to produce a strong and considerably delayed echo.

10. A mobile station as claimed in claim 7 wherein, while speech signals are being received, said adaptive filter uses filter coefficients calculated during a previous pause.

11. A mobile station as claimed in claim 7, wherein said subtracter and adaptive filter, and a decoder for decoding received coded signals, are functions performed by said signal processor.

12. A mobile station as claimed in claim 11, wherein said signal processor, during pauses in speech received by the mobile station, generates only codes for background noise.

13. A mobile station as claimed in claim 11, comprising a microphone and a loudspeaker spaced apart a distance sufficient to produce a strong and considerably delayed echo.

14. A circuit arrangement for one side of a system for simultaneously transmitting and receiving codes which are coded speech signals corresponding to respective speech signals between two sides in two directions, comprising:

a coding arrangement for generating codes from the respective speech signals received by said one side, comprising a signal processor having a first processing capacity, wherein said signal processor generates respective coded speech signals, from speech signals received by the one side, requiring said first processing capacity; and during pauses in speech received by said one side, generates codes requiring a second processing capacity considerably less than said first processing capacity, thereby leaving an unused processing capacity during said pauses, and means for canceling acoustic echoes, said means for canceling comprising a subtracter, an adaptive filter for filtering speech signals received by said one side, and arithmetic unit means operable only during said pauses in speech for determining the filter coefficients of the filter, said arithmetic unit means being formed by said signal processor, and using said unused processing capacity, whereby a separate arithmetic unit for determining said filter coefficients is not necessary.

15. A circuit arrangement as claimed in claim 14, wherein said signal processor, during pauses in speech received by said one side, generates only codes for background noise.

16. A circuit arrangement as claimed in claim 14 wherein, while speech signals are being received, said adaptive filter uses filter coefficients calculated during a previous pause.

17. A circuit arrangement as claimed in claim 14, wherein said subtracter and adaptive filter, and a decoder for decoding received coded signals, are functions performed by said signal processor.

18. A circuit arrangement as claimed in claim 17 wherein, while speech signals are being received, said adaptive filter uses filter coefficients calculated during a previous pause.

19. A circuit arrangement as claimed in claim 17, wherein said signal processor, during pauses in speech received by said one side, generates only codes for background noise.

20. A circuit arrangement as claimed in claim 19 wherein, while speech signals are being received, said adaptive filter uses filter coefficients calculated during a previous pause.

* * * * *